United States Patent
Shan et al.

(10) Patent No.: US 11,924,079 B2
(45) Date of Patent: Mar. 5, 2024

(54) OPERATIONS, ADMINISTRATION AND MANAGEMENT INFORMATION PROCESSING METHOD AND DEVICE

(71) Applicant: SUZHOU CENTEC COMMUNICATIONS CO., LTD., Jiangsu (CN)

(72) Inventors: Zhe Shan, Suzhou (CN); Shujun Yang, Suzhou (CN); Haidong Gong, Suzhou (CN)

( * ) Notice: Subject to any disclaimer, the term of this patent is extended or adjusted under 35 U.S.C. 154(b) by 430 days.

(21) Appl. No.: 17/434,054

(22) PCT Filed: May 23, 2019

(86) PCT No.: PCT/CN2019/088196
§ 371 (c)(1),
(2) Date: Aug. 26, 2021

(87) PCT Pub. No.: WO2020/133897
PCT Pub. Date: Jul. 2, 2020

(65) Prior Publication Data
US 2022/0217067 A1    Jul. 7, 2022

(30) Foreign Application Priority Data
Dec. 26, 2018  (CN) .......................... 201811601987.7

(51) Int. Cl.
*H04L 43/0852* (2022.01)
*H04L 1/00* (2006.01)
(Continued)

(52) U.S. Cl.
CPC ........ *H04L 43/0852* (2013.01); *H04L 1/0061* (2013.01); *H04L 43/0811* (2013.01); *H04L 43/0823* (2013.01)

(58) Field of Classification Search
CPC ............... H04L 43/0852; H04L 1/0061; H04L 43/0811; H04L 43/0823; H04L 1/0041;
(Continued)

(56) References Cited

U.S. PATENT DOCUMENTS 11,121,907 B2 *  9/2021  Huang .................... H04L 41/00
2017/0005949 A1    1/2017  Gareau
(Continued)

FOREIGN PATENT DOCUMENTS

CN    101227450 A    7/2008
CN    102957613 A    3/2013
(Continued)

OTHER PUBLICATIONS

International Search Report in the international application No. PCT/CN2019/088196, dated Sep. 10, 2019, 2 pgs.
(Continued)

*Primary Examiner* — Abdullahi Ahmed
(74) *Attorney, Agent, or Firm* — Cooper Legal Group, LLC

(57) ABSTRACT

Disclosed is an operations, administration and management (OAM) information processing method. The method comprises: obtaining at a flexible Ethernet (FlexE) layer a data code block sent by a communication opposite end, and determining a first OAM data code block in a data code block according to a preset first determination rule; determining, according to a preset second determination rule, an OAM function corresponding to the first OAM data code block; parsing, according to the function type corresponding to the first OAM data code block, the parsing data in the first OAM data code block by using a preset parsing rule; and executing the OAM function by using the parsing data. Disclosed is an OAM information processing device, and a storage medium.

20 Claims, 14 Drawing Sheets

(51) Int. Cl.
*H04L 43/0811* (2022.01)
*H04L 43/0823* (2022.01)

(58) Field of Classification Search
CPC ...... H04L 43/106; H04L 43/16; H04J 3/0697; H04J 2203/006; H04J 2203/0085; H04J 3/14; H04J 3/1658
See application file for complete search history.

(56) References Cited

U.S. PATENT DOCUMENTS

| | | | | |
|---|---|---|---|---|
| 2019/0280913 | A1* | 9/2019 | Huang | H04L 47/82 |
| 2020/0195760 | A1* | 6/2020 | Wang | H04L 69/22 |
| 2020/0220650 | A1* | 7/2020 | Cheng | H04L 1/0023 |
| 2020/0259728 | A1* | 8/2020 | Oren | H04L 41/26 |
| 2020/0322246 | A1* | 10/2020 | Wang | H04J 3/1658 |
| 2020/0396097 | A1* | 12/2020 | Deng | H04L 69/22 |
| 2020/0412471 | A1* | 12/2020 | Gareau | H04J 3/0697 |
| 2023/0155756 | A1* | 5/2023 | Qi | H04L 67/60 370/458 |

FOREIGN PATENT DOCUMENTS

| | | |
|---|---|---|
| CN | 106612220 A | 5/2017 |
| CN | 107508732 A | 12/2017 |
| CN | 108123813 A | 6/2018 |
| CN | 108521343 A | 9/2018 |
| CN | 109728948 A | 5/2019 |
| EP | 3393136 A1 | 10/2018 |

OTHER PUBLICATIONS

English translation of the Written Opinion of the International Search Authority in the international application No. PCT/CN2019/088196, dated Sep. 10, 2019, 5 pgs.

China Mobile, "Technical Vision of Slicing Packet Network (SPN) for 5G Transport", (Version 1.0), Feb. 2018, China Mobile Communications Corporation, 25 pgs.

* cited by examiner

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 0 | \multicolumn{8}{l|}{0x4B} | \multicolumn{8}{l|}{Data1} | \multicolumn{8}{l|}{Data2} | \multicolumn{8}{l|}{Data3} | \multicolumn{4}{l|}{0xC} | \multicolumn{4}{l|}{0x0} | \multicolumn{8}{l|}{Data4} | \multicolumn{8}{l|}{Data5} | \multicolumn{8}{l|}{Data6} |

FIG. 3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | 0 | 0x4B | | | | | | | | Resv 00 | | Type | | | | | | Value1 | | | | | | | | Value2 | | | | | | | | 0xC | | | | 0x0 | | | | Value3 | | | | | | | | Value4 | | | | | | | | Seq | | | | CRC4 | | | | |

FIG. 4

| 优先级 | 0 1 | 2 3 4 5 6 7 8 9 10 11 | 12 13 14 15 16 17 | 18 19 20 21 22 23 24 25 | 26 27 28 29 30 31 32 33 | 34 35 36 37 | 38 39 40 41 | 42 43 44 45 46 47 48 49 | 50 51 52 53 54 55 56 57 | 58 59 60 61 | 62 63 64 65 |
|---|---|---|---|---|---|---|---|---|---|---|---|
| | 1 0 | 0x 4B | Resv | Type | Value1 | Value2 | 0xC | 0x0 | Value3 | Value4 | Seq | CRC4 |
| BAS H | 1 0 | 0x 4B | Resv 00 | 0x1 | REI[0] REI[1] REI[2] REI[3] RDI CS_LF CS_LP CS_RF | Rsev 000000 Pencd[0] Pencd[1] | 0xC | 0x0 | Rsev 0x 00 | BIP | Seq | CRC4 |
| APS H | 1 0 | 0x 4B | Resv | 0x 2 | APS_data[B0] | APS_data[B1] | 0xC | 0x0 | APS_data[B2] | APS_data[B3] | 0x 0 | CRC4 |
| CV L | 1 0 | 0x 4B | Resv | 0x 11 | SAPI[B0] | SAPI[B1] | 0xC | 0x0 | SAPI[B2] | SAPI[B2] | 0x 0 | CRC4 |
| | 1 0 | 0x 4B | Resv | 0x 11 | SAPI[B4] | SAPI[B5] | 0xC | 0x0 | SAPI[B6] | SAPI[B6] | 0x 1 | CRC4 |
| | 1 0 | 0x 4B | Resv | 0x 11 | SAPI[B8] | SAPI[B9] | 0xC | 0x0 | SAPI[B10] | SAPI[B10] | 0x 2 | CRC4 |
| | 1 0 | 0x 4B | Resv | 0x 11 | SAPI[B12] | SAPI[B13] | 0xC | 0x0 | SAPI[B14] | SAPI[B14] | 0x 3 | CRC4 |
| | 1 0 | 0x 4B | Resv | 0x 11 | DAPI[B0] | DAPI[B1] | 0xC | 0x0 | DAPI[B2] | DAPI[B2] | 0x 4 | CRC4 |
| | 1 0 | 0x 4B | Resv | 0x 11 | DAPI[B4] | DAPI[B5] | 0xC | 0x0 | DAPI[B6] | DAPI[B6] | 0x 5 | CRC4 |
| | 1 0 | 0x 4B | Resv | 0x 11 | DAPI[B8] | DAPI[B9] | 0xC | 0x0 | DAPI[B10] | DAPI[B10] | 0x 6 | CRC4 |
| | 1 0 | 0x 4B | Resv | 0x 11 | DAPI[B12] | DAPI[B13] | 0xC | 0x0 | DAPI[B14] | DAPI[B14] | 0x 7 | CRC4 |
| 1DM L | 1 0 | 0x 4B | Resv | 0x 12 | Tx-f-TS[B0] | Tx-f-TS[B1] | 0xC | 0x0 | Tx-f-TS[B2] | Tx-f-TS[B3] | 0x 0 | CRC4 |
| | 1 0 | 0x 4B | Resv | 0x 12 | Tx-f-TS[B4] | Tx-f-TS[B5] | 0xC | 0x0 | Tx-f-TS[B6] | Tx-f-TS[B7] | 0x 1 | CRC4 |
| 2DMM L | 1 0 | 0x 4B | Resv | 0x 13 | Tx-f-TS[B0] | Tx-f-TS[B1] | 0xC | 0x0 | Tx-f-TS[B2] | Tx-f-TS[B3] | 0x 0 | CRC4 |
| | 1 0 | 0x 4B | Resv | 0x 13 | Tx-f-TS[B4] | Tx-f-TS[B5] | 0xC | 0x0 | Tx-f-TS[B6] | Tx-f-TS[B7] | 0x 1 | CRC4 |
| 2DMR L | 1 0 | 0x 4B | Resv | 0x 14 | Tx-f-TS[B0] | Tx-f-TS[B1] | 0xC | 0x0 | Tx-f-TS[B2] | Tx-f-TS[B3] | 0x 0 | CRC4 |
| | 1 0 | 0x 4B | Resv | 0x 14 | Tx-f-TS[B4] | Tx-f-TS[B5] | 0xC | 0x0 | Tx-f-TS[B6] | Tx-f-TS[B7] | 0x 1 | CRC4 |
| | 1 0 | 0x 4B | Resv | 0x 14 | Rx-b-TS[B0] | Rx-b-TS[B1] | 0xC | 0x0 | Rx-b-TS[B0] | Rx-b-TS[B1] | 0x 2 | CRC4 |
| | 1 0 | 0x 4B | Resv | 0x 14 | Rx-b-TS[B4] | Rx-b-TS[B5] | 0xC | 0x0 | Rx-b-TS[B4] | Rx-b-TS[B5] | 0x 3 | CRC4 |
| | 1 0 | 0x 4B | Resv | 0x 14 | Tx-b-TS[B0] | Tx-b-TS[B1] | 0xC | 0x0 | Tx-b-TS[B2] | Tx-b-TS[B3] | 0x 4 | CRC4 |
| | 1 0 | 0x 4B | Resv | 0x 14 | Tx-b-TS[B4] | Tx-b-TS[B5] | 0xC | 0x0 | Tx-b-TS[B6] | Tx-b-TS[B7] | 0x 5 | CRC4 |
| CS | 1 0 | 0x 4B | Resv | 0x 15 | CS_Type | Resv | 0xC | 0x0 | Resv | Resv | 0x 0 | CRC4 |

FIG. 5

OPERATIONS, ADMINISTRATION AND MANAGEMENT INFORMATION PROCESSING METHOD AND DEVICE

CROSS-REFERENCE TO RELATED APPLICATION

The disclosure is filed based upon and claims priority to Chinese patent application No. 201811601987.7, filed on Dec. 26, 2018, the disclosure of which is hereby incorporated by reference in its entirety.

TECHNICAL FIELD

The disclosure relates, but is not limited, to the technology of Flex Ethernet (FlexE), and in particular to a method and device for processing Operation Administration and Maintenance (OAM) information.

BACKGROUND

FlexE is provided for solving a problem that flexibility of an Ethernet router and a switch are limited by a fixed rate of an Ethernet interface. The FlexE is an interface technology of a bearer network for realizing service isolation bearing and network fragmentation, which is rapidly developed in recent years, and is widely accepted by major standards organizations.

Like other network technologies, OAM is a very important function. By means of OAM, a quality of service may be ensured, an operation may be simplified, and an operation cost may be reduced.

Usually, an OAM block is sent to a Media Access Control (MAC) layer to be processed after being processed by a FlexE layer, and then sent to a main Switch Core (SC) to be subjected to OAM message processing. However, this approach has low real-time processing effects and a low system response performance.

Meanwhile, for the new customized format of the OAM block provided for a network operator, there is no new way to deal with it at present.

Therefore, how to improve the real-time processing effects of the OAM block, to improve the system response performance and to adapt to different formats of the OAM block are all urgent problems to be solved.

SUMMARY

The technical solutions in embodiments of the disclosure are implemented as follows. The embodiments of the disclosure provide a method for processing OAM information, and the method includes the following operations.

Data blocks sent by a communication peer end are acquired in a FlexE layer, and a first OAM block in the data blocks is determined according to a pre-set first determination rule.

An OAM function corresponding to the first OAM block is determined according to a pre-set second determination rule; data in the first OAM block is parsed out by adopting a pre-set parsing rule according to a function type corresponding to the first OAM block; and the OAM function is executed by adopting the parsed data.

The embodiments of the disclosure further provide a device for processing OAM information, which includes an acquisition module and a processing module.

The acquisition module is configured to acquire data blocks sent by a communication peer end in a FlexE layer, and determine a first OAM block in the data blocks according to a pre-set first determination rule.

The processing module is configured to determine an OAM function corresponding to the first OAM block according to a pre-set second determination rule; parse out data in the first OAM block by adopting a pre-set parsing rule according to a function type corresponding to the first OAM block; and execute the OAM function by adopting the parsed data.

The embodiments of the disclosure further provide a storage medium having stored therein an executable program that, when being executed by a processor, causes the processor to implement steps of the above method for processing OAM information.

The embodiments of the disclosure further provide a device for processing OAM information, which includes a processor, and a memory for storing programs executable by the processor. The processor is configured to execute the programs to implement the steps of the above method for processing OAM information.

According to the method and device for processing OAM information provided in the embodiments of the disclosure, the data blocks sent by the communication peer end are acquired in the FlexE layer, the first OAM block in the data blocks is determined according to the pre-set first determination rule; the OAM function corresponding to the first OAM block is determined according to the pre-set second determination rule; the data in the first OAM block is parsed out by adopting the pre-set parsing rule according to the function type corresponding to the first OAM block; and the OAM function is executed by adopting the parsed data. Thus, the OAM block is directly processed in the FlexE layer, so that the real-time processing effects of the OAM block are improved, and the system response performance is improved. Moreover, the OAM block and the function type thereof are identified by adoption of the pre-set first determination rule and second determination rule, and different formats of the OAM blocks may be adapted.

BRIEF DESCRIPTION OF THE DRAWINGS

FIG. 3 is a schematic diagram illustrates a format of a data block according to an embodiment of the disclosure.

FIG. 4 is a schematic diagram illustrates a format of an OAM block according to an embodiment of the disclosure.

FIG. 5 is a schematic diagram illustrates formats of the OAM blocks having different functions according to an embodiment of the disclosure.

DETAILED DESCRIPTION

In the embodiments of the disclosure, data blocks sent by a communication peer end are acquired in a FlexE layer, a first OAM block in the data blocks is determined according to a pre-set first determination rule; an OAM function corresponding to the first OAM block is determined according to a pre-set second determination rule; data in the first OAM block is parsed out by adopting a pre-set parsing rule according to the function type corresponding to the first OAM block; and the OAM function is executed by adopting the parsed data.

The disclosure is further described in detail in combination with the embodiments below.

Figure 1:
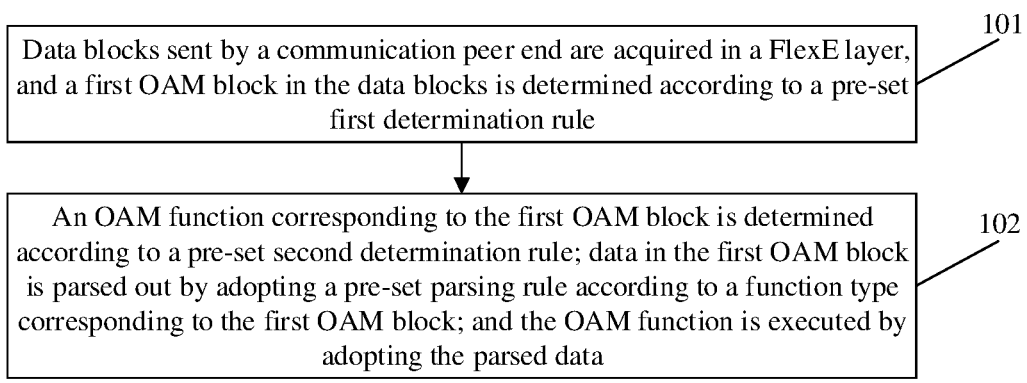
FIG. 1 illustrates a flowchart of a method for processing OAM information according to an embodiment of the disclosure.

An embodiment of the disclosure provides a method for processing OAM information. As shown in FIG. 1, the method may include the following operation.

At 101, data blocks sent by a communication peer end are acquired in a FlexE layer, and a first OAM block in the data blocks is determined according to a pre-set first determination rule.

Figure 2:
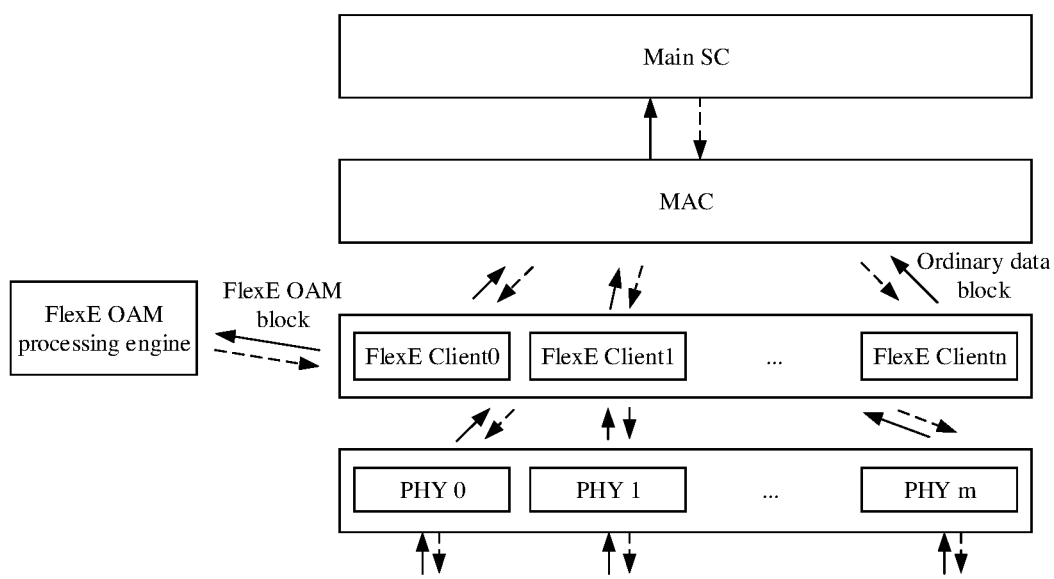
FIG. 2 is a schematic diagram illustrates network architecture of a method for processing OAM information according to an embodiment of the disclosure.

As shown in FIG. 2, the FlexE layer is an intermediate layer created between the MAC layer and the PHY layer. The FlexE provides a universal mechanism, a physical Ethernet port is divided into multiple Ethernet flexible hard pipelines based on slot scheduling, and data of multiple Client (or FlexE Client) interfaces are scheduled according to a slot mode and distributed to multiple different sub-channels. Furthermore, service isolation may be achieved. OAM management adopted in the related art is realized above an MAC layer, such as in a main SC, through protocols including Ether OAM and the like.

Herein, a processing engine may be set to perform OAM management in the FlexE layer, so that the data block on the FlexE layer coded in 64B/66B is processed. The FlexE OAM processing engine may be implemented through Application Specific Integrated Circuit (ASIC) and the like. The data block on the FlexE layer is usually transmitted to the FlexE layer through PHY by the communication peer end.

The pre-set first determination rule may be set according to the format of the OAM block, and the first OAM block in the data blocks transmitted in the FlexE layer is extracted into the processing engine for processing through information at a specific position of the OAM block.

In some embodiments, the format of the OAM block may be customized. As shown in FIG. 3, the OAM block may be transmitted by using the same 64B/66B format as that of an ordinary data block, and distinguished by using 0 code in a control block. The 0 code is from the 2th bit to the 9th bit, and the data block can be represented as a control block by using 0x4B. C code is configurable by default, and can be adopted with 0xC; when the C code in the 0x4B control block is 0xC, it is determined that the data block is an OAM block. The OAM block may use six Data in the control block to carry OAM messages, and the specific field format of the OAM block may be shown in FIG. 4.

0x4B field is 0 code, and occupies 8 bits; 0x4B represents that the block is a control block.

Resv field occupies 2 bits, which is a reserved field and has a default value of 0.

Type field occupies 6 bits, and identifies different function types of different OAMs.

Value field occupies 32 bits, and represents contents of an OAM message in a specific type.

C code occupies 4 bits, has a default value of 0xC, the value may be set, and represents that the data block is a FlexE OAM block.

Sequence Number (Seq) field occupies 4 bits, and is used for identifying sequence numbers of various data blocks in the OAM block composed of multiple data blocks.

Cyclical Redundancy Check 4 (CRC4) field occupies 4 bits, and for an OAM block, there are a total of 60 bits for checking when excluding the CRC4, and an algorithm polynomial of the CRC4 may be $x^4+x+1$.

In some embodiments, the first OAM block may include more than one data blocks.

The first OAM block may be composed of one or more data blocks, a composition rule for the OAM block and data content in each of the data blocks may be preset.

In some embodiments, the OAM block may realize different management functions, and the function types of the OAM block may include: a BAS function, an Automatic Protection Switching (APS) function, a CV function, a 1DM function, a 2DMM function, a 2DMR function, a Client Signal (CS) function or the like.

The BAS function may include: a connectivity check function, a Bit Interleaved Parity (BIP) function, a Remote Defect Indication (RDI) function, a Remote Error Indication (REI) function, a Bit Error Rate (BER) calculation function, a Client Link Near-end Failure (CS_LF) function and/or a Client Link Remote-end Failure (CS_RF) function.

The formats of the OAM blocks corresponding to different OAM functions may be shown in FIG. 5. The OAM blocks having different functions may be in a single block form, namely composed of one data block, and may also be in a multi-block form, namely composed of a plurality of data blocks. Functions, identification information, priorities and the like of different OAM blocks may be shown in Table 1.

TABLE 1

| OAM function | Type | Priority | Classification | Description |
| --- | --- | --- | --- | --- |
| BAS | 0 × 1 | High | Single-block OAM | A basic block, used for real-time sending of a basic OAM message, including CV, BIP check, RDI, REI, CS_LF and CS_RF functions. |
| APS | 0 × 2 | High | Single-block OAM | An APS message block, used for performing APS. |

TABLE 1-continued

| OAM function | Type | Priority | Classification | Description |
| --- | --- | --- | --- | --- |
| CV | 0 × 11 | Low | Multi-block OAM | A CV block, used for performing CV. |
| 1DM | 0 × 12 | Low | Multi-block OAM | A one-way delay block, used for a one-way delay measurement message. |
| 2DMM | 0 × 13 | Low | Multi-block OAM | A two-way delay measurement block, used for sending a two-way delay measurement message. |
| 2DMR | 0 × 14 | Low | Multi-block OAM | A two-way delay reply block, used for replying to a two-way delay measurement message. |
| CS | 0 × 15 | Low | Single-block OAM | A CS indication block, used for indicating a type of a CS. |

In some embodiments, out-of-band information corresponding to the first OAM block may be acquired.

The out-of-band information may be independently transmitted in a channel different from that of an ordinary data block, may also be information for counting the data blocks and the like. Out-of-band information having the same transmission slot with the first OAM block may be determined as out-of-band information corresponding to the first OAM block. The out-of-band information may include: Client ID, client link signal quality information, BIP check information, a timestamp while receiving a data block and the like. The Client ID may be determined according to the slot, and the BIP check information may be acquired by a local technology. The timestamp while receiving the data block is a receiving timestamp on the FlexE layer. The out-of-band information may be used for processing of the OAM block.

At 102, the OAM function corresponding to the first OAM block is determined according to the pre-set second determination rule; data in the first OAM block is parsed out by adopting the pre-set parsing rule according to the function type corresponding to the first OAM block; and the OAM function is executed by adopting the parsed data.

Herein, the second determination rule may be determined according to the field format of the first OAM block. Taking the first OAM block in the FIG. 5 as an example, the OAM function type corresponding to the first OAM block may be determined according to the type field.

The pre-set parsing rule may be determined according to a block format corresponding to the OAM function type of the first OAM block. Taking the BIP function of a BAS block as an example, it can be known that the 50th bit to the 57th bit can be parsed as a BIP check code from the block format of an OAM block shown in FIG. 5. Data in a plurality of OAM blocks forming the CV function and the like may also be parsed.

The first OAM block is parsed according to the OAM function type. Required parsed data may be extracted according to the field format of the first OAM block having a respective OAM function type, and the OAM function is executed.

In some embodiments, the OAM function may be executed by adopting the parsed data and the out-of-band information.

Usually, for first OAM blocks having some function types, the corresponding OAM functions may be executed only in combination with the out-of-band information. Herein, such processing may be implemented in combination with the acquired out-of-band information. For example, for a BIP function in BAS, a BIP check code in the first OAM block is required to be compared with a BIP check code in the out-of-band information and the like.

Figure 6:
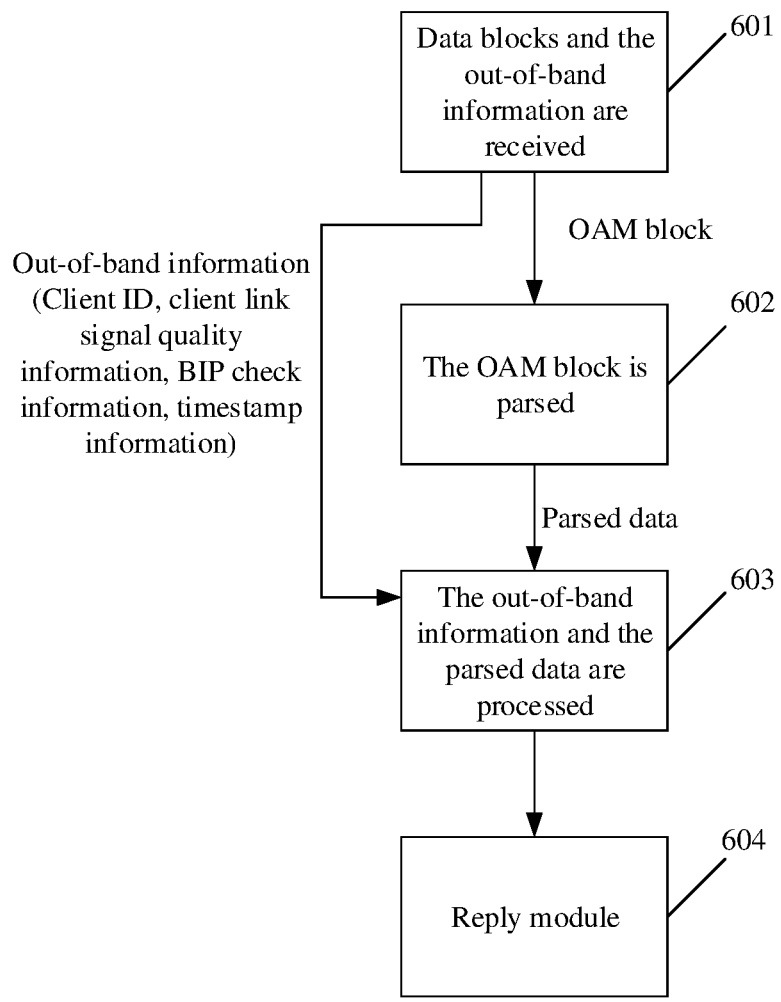
FIG. 6 illustrates an overall flowchart for processing OAM information according to an embodiment of the disclosure.

In some embodiments, as shown in FIG. 6, the overall process that the FlexE OAM processing engine performs processing after receiving the data block may include the following operations.

At 601, the data blocks and the out-of-band information are received, and the OAM block is extracted. The out-of-band information may include Client ID, client link signal quality information, BIP check information, a timestamp while receiving a block and the like.

In some embodiments, operation 602 may be executed for the OAM block. The out-of-band information may be transmitted into a processing module of the FlexE OAM processing engine through a bus in the OAM processing engine, and processed in combination with a parsed OAM block.

At 602, data in the OAM block is parsed out according to the type of the OAM block.

At 603, the parsed data of the OAM block and the out-of-band information are processed according to the OAM function type.

At 604, if the OAM function type includes sending information to the communication peer end, corresponding information is replied.

In some embodiments, before the operation that the OAM function is executed by adopting the first OAM block or adopting the first OAM block and the out-of-band information, the method may further include: validity check is performed on the first OAM block; the validity check includes calculation and check of a CRC value.

Figure 7:
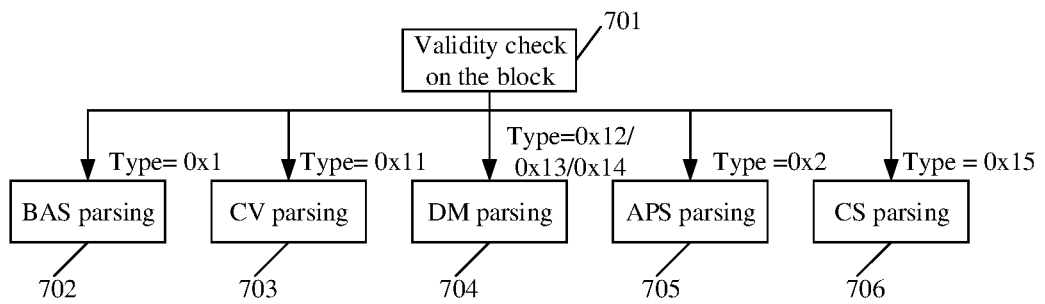
FIG. 7 illustrates a flowchart for parsing an OAM block according to an embodiment of the disclosure.

In some embodiments, as shown in FIG. 7, the parsing process of the FlexE OAM processing engine may include the following operations.

At 701, the module firstly performs validity check on a received OAM block, including calculation and check of a CRC value.

At 702-706, data parsing is respectively implemented according to function types of different OAM blocks. Parsed contents are put into BUS in the processing engine, and are used for specific processing modules of various blocks. Herein, the parsing process may be a process that data required by a respective function type is extracted from the OAM block in a single-block form or a multi-block form. Operation 702 to operation 706 may be executed in any order.

Figure 8:
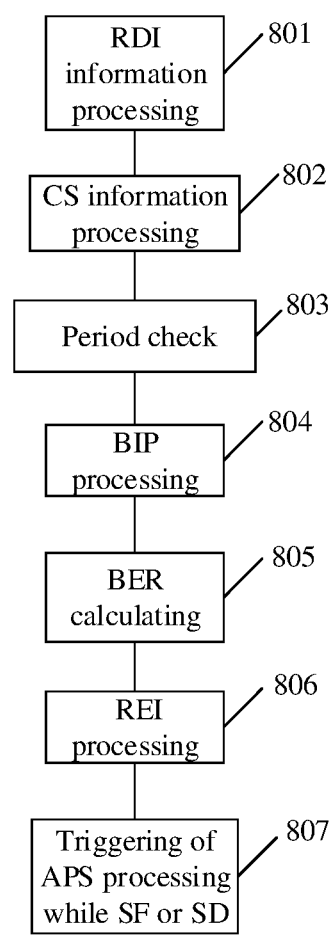
FIG. 8 illustrates a flowchart for processing an OAM block having a Basic (BAS) function according to an embodiment of the disclosure.

Functions included in the parsed OAM block having the BAS function may be processed in sequence. The processing flow is shown in FIG. 8. Operation 801 to operation 807 may be executed according to a sequence as shown in FIG. 8, and may also be executed through a customized sequence.

At 801, RDI information processing is performed to determine a fault condition at a remote end according to RDI information in the OAM block.

At 802, CS information processing is performed to determine a link failure condition according to CS_LF and/or CS_RF indication information in the OAM block.

At 803, period check is performed to determine a period condition according to data in the OAM block.

At 804, BIP information processing is performed to compare the BIP check code in BAS with the BIP check code in the out-of-band information and to determine whether a transmission problem occurs or not.

At 805, BER calculation processing is performed to calculate the BER of network transmission.

At 806, REI processing is performed to indicate a bit error of remote network connection.

At 807, APS may be triggered according to a link failure condition. The link failure condition may include the BER in operation 805 and the like. The BER may be compared with a BER threshold of Signal Failure (SF) or Signal Degrading (SD) set by a user. If the BER exceeds a corresponding threshold, it is considered that SF or SD occurs, and APS processing is triggered. When the BER is lower than the BER threshold of SF or SD, SF or SD is eliminated, and a configurable APS switchback processing is triggered.

Figure 9:
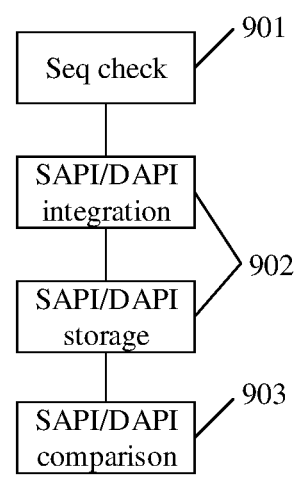
FIG. 9 illustrates a flowchart for processing an OAM block having a Connectivity Verification (CV) function according to an embodiment of the disclosure.

A CV function usually refers to that a received Source Access Point Identifier (SAPI) and a Destination Access Point Identifier (DAPI) are compared with a pre-set value and an alarm is generated when there is no matching. As shown in FIG. 9, the processing flow on the parsed OAM block having the CV function may include the following operations.

At 901, a CV block processing module is configured to perform sequence number check.

Herein, the OAM block having the CV function may be composed of a plurality of data blocks. As shown in FIG. 5, the OAM block having the CV function may be composed of eight data blocks. The integrity of the OAM block having the CV function may be checked through a pre-set sequence number.

At S902, SAPI/DAPI in the plurality of data blocks of the OAM block having the CV function are integrated, and furthermore, the integrated SAPI/DAPI is stored.

Herein, data in the plurality of data blocks may be read in sequence, integrated into complete SAPI/DAPI data, and stored.

At 903, comparison with SAPI/DAPI corresponding to Client configured locally is implemented when the plurality of data blocks are received completely, and whether mismatching occurs or not is determined according to a comparison result and reported to a system.

An OAM block having a CS function is used for comparing a client signal with a pre-stored signal. The processing flow on the parsed OAM block having the CS function may only include CS type check. A CS type in a received block is compared with a CS type configured locally, and whether a mismatching occurs or not is determined and reported to the system. Herein, a CS type may include: unequipped, Ethernet, Synchronous Digital Hierarchy (SDH) and the like.

Figure 10:
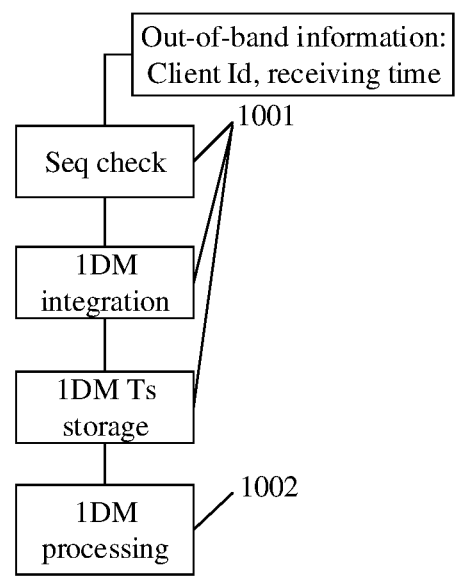
FIG. 10 illustrates a flowchart for processing an OAM block having a One-way Delay Measure (1DM) function according to an embodiment of the disclosure.

An OAM block having a 1DM function is used for detecting delay conditions of sending and receiving. As shown in FIG. 10, the processing flow on the parsed OAM block having the 1DM function may include the following operations.

At 1001, in a processing module, DM storage table entries are indexed based on Client ID of the out-of-band information, a sequence number is checked, integrated processing is implemented on a plurality of blocks, and timestamps of the plurality of blocks of 1DM are stored. In addition, when the plurality of blocks are received completely, for the OAM block having the 1DM function as shown in FIG. 5, correct receiving of two continuous and valid 1DM blocks represents complete receiving.

At 1002, a timestamp in the received OAM block having the 1DM function is used as a timestamp Ttx when sending from a remote end. A timestamp in the out-of-band information is a timestamp Trx when receiving the first 1DM OAM block. According to a definition in specification, line delay is calculated as Delay=Trx-Ttx, which is recorded as a table entry and provided for an upper-level layer to use.

Figure 11:
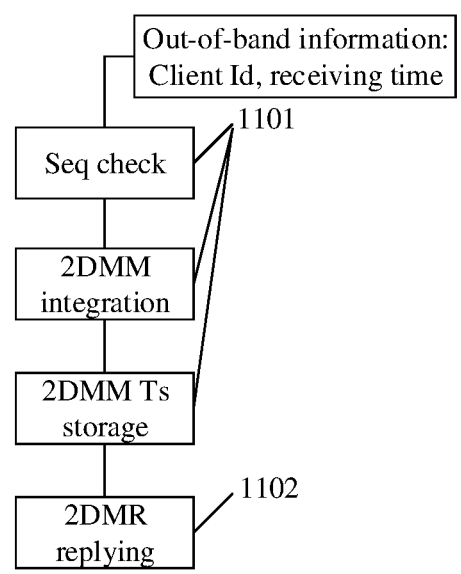
FIG. 11 illustrates a flowchart for processing an OAM block having a Two-Way Delay Measurement Message (2DMM) function according to an embodiment of the disclosure.

An OAM block having a 2DMM function is used for detecting delay conditions of two-way sending and receiving. Usually, a 2DMR data block is sent after the OAM block having the 2DMM function is received. As shown in FIG. 5, the OAM block having the 2DMM function may be composed of six data blocks. The processing flow on the parsed OAM block having the 2DMM function is shown in FIG. 11.

At 1101, in a 2DMM processing module, a method of receiving and integrating the OAM block having the 2DMM function and acquiring a timestamp is similar to the method of processing the OAM block having the 1DM function.

At 1102, when a plurality of data blocks of the OAM block having the 2DMM function are received completely, 2DMR is required to be replied. The OAM block having the 2DMR function totally includes six continuous data blocks. In replied 2DMR, timestamps in two data blocks in which Seq value is 0 and 1 respectively are replicated from 2DMM. The timestamp in the out-of-band information is a timestamp of receiving 2DMM. The timestamp of receiving 2DMM is set into two data blocks having the 2DMR function in which the Seq value is 2 and 3 respectively, and a timestamp while sending 2DMR is set into two data blocks having the 2DMR function in which the Seq value is 4 and 5 respectively. 2DMR is sent to a peer FlexE device to perform Delay Measure (DM).

Figure 12:
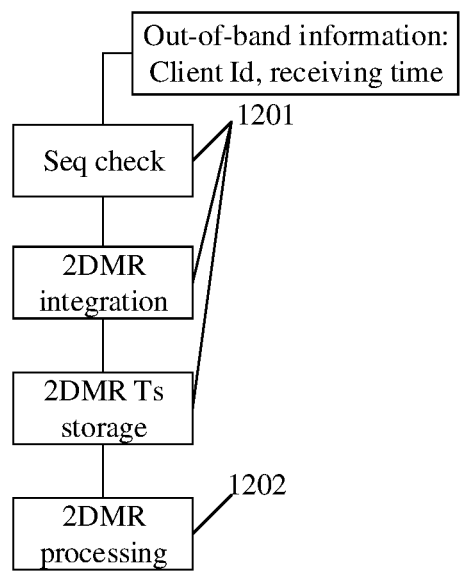
FIG. 12 illustrates a flowchart for processing an OAM block having a Two-Way Delay Measurement Reply (2DMR) function according to an embodiment of the disclosure.

An OAM block having a 2DMR function is used for detecting delay conditions of two-way sending and receiving. A 2DMR data block received from the communication peer end is usually subjected to delay measurement. The processing flow on the parsed OAM block having the 2DMR function is shown in FIG. 12.

At 1201, in a 2DMR processing module, processing including receiving, integrating, storing and the like is performed on a plurality of data blocks of the OAM block at first.

At 1202, when the plurality of blocks are received completely, timestamp information in 2DMR is required to be subjected to delay calculation. As shown in a 2DMR format in FIG. 5, a corresponding 2DMM sending timestamp (Tx_f_TS), 2DMM receiving timestamp (Rx_b_TS) and 2DMR sending timestamp (Tx_b_TS) may be taken from six blocks of 2DMR, and the timestamp in the out-of-band information is represented as a timestamp when receiving a 2DMR OAM block, namely a 2DRM receiving timestamp. A two-way delay may be calculated as: (the 2DMR receiving timestamp−the 2DMM sending timestamp)−(the 2DMR sending timestamp−2DMM receiving timestamp), and provided for an upper-level layer to use.

In some embodiments, a second OAM block may be sent to the communication peer end in the FlexE layer.

Herein, the second OAM block may be a data block, the transmission direction of which is opposite to that of the first OAM block. The second OAM block is directly sent from the FlexE layer through the OAM processing engine. Therefore, the real-time processing effects of the OAM block may be improved, and the system response performance may be improved. The second OAM block may be a reply data block to the OAM block received from the communication peer end, and may further be an OAM block actively sent to the communication peer end.

In some embodiments, a time pulse of 16K data blocks may be used as a transmitting time unit. The second OAM block is sent to the communication peer end with an interval of a pre-set number of the transmitting time units.

Figure 13:
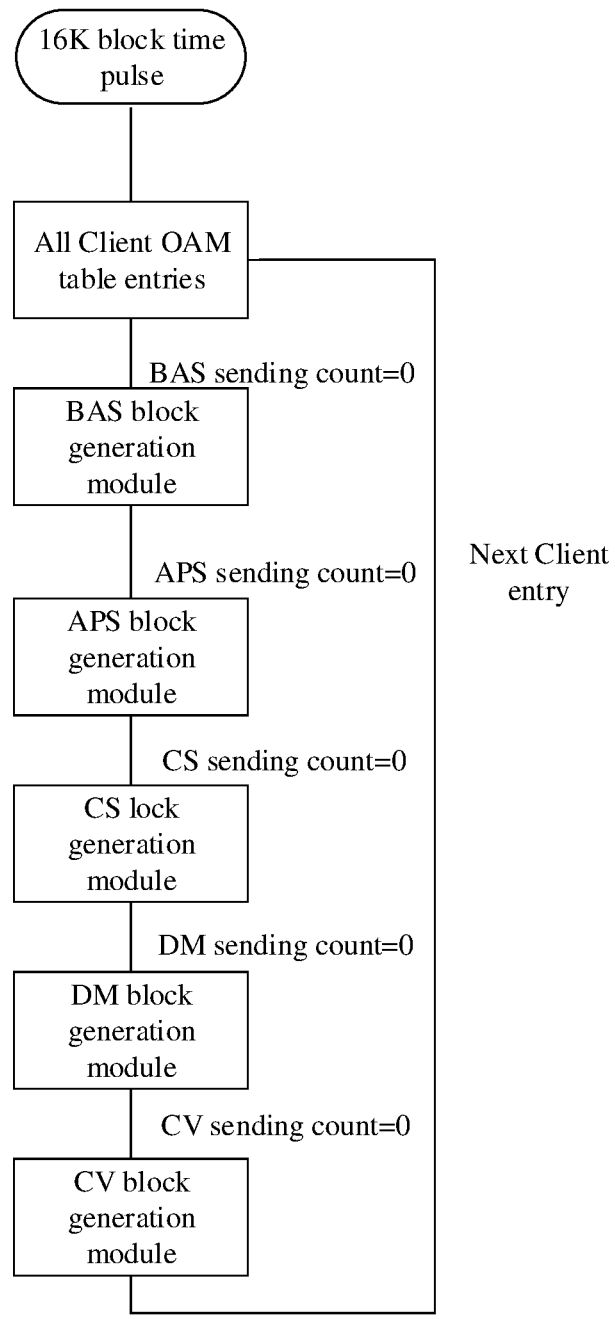
FIG. 13 illustrates a flowchart of sending of an OAM block according to an embodiment of the disclosure.

Herein, as shown in FIG. 13, the time pulse of 16K data blocks may be used as a time unit for time counting, indicating the sending time of various OAM blocks. Various function blocks have corresponding sending counting configuration, and a sending counting configuration value takes the time of 16K blocks as a unit. Thereby, different time intervals may be configured for the sending counting configuration value. In entire time cycle, table entries related to all Clients are read with the time interval pulse of the 16K blocks. For each processing, the sending count configured in the table entries is subtracted by 1. When the sending count is subtracted to 0, it represents that the type of OAM block is required to be sent at this time. Then, processing of a sending module is implemented. Furthermore, occurrence count is reset to a configured block sending period, and used for time counting of a next OAM block.

In some embodiments, when the second OAM block has a BAS function, a check code of BIP corresponding to the second OAM block is set into the second OAM block in the FlexE layer. When the second OAM block has a 1DM function or 2DMM function, the sending time of the second OAM block in the FlexE layer is set as a sending timestamp in the second OAM block.

For BAS, a control flag for adding BIP information is required to be increased in the out-of-band information sent to the FlexE layer while accompanying sending of a block. The calculated check code of BIP is set into a corresponding position by the FlexE layer. For a DM related block, a control flag for adding a timestamp is required to be put in the out-of-band information, and the acquired timestamp is set into a corresponding position by the FlexE layer while sending the block.

Figure 14:
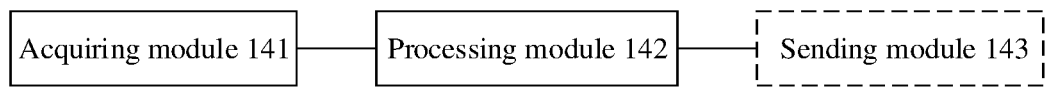
FIG. 14 illustrates a composition diagram of a device for processing OAM information according to an embodiment of the disclosure.

An embodiment of the disclosure provides a device for processing OAM information. As shown in FIG. 14, the device may include an acquisition module 141 and a processing module 142.

The acquisition module 141 is configured to acquire data blocks sent by a communication peer end in the FlexE layer, and determine a first OAM block in the data blocks according to a pre-set first determination rule.

As shown in FIG. 2, the FlexE layer is an intermediate layer created between the MAC layer and the PHY layer. The FlexE provides a universal mechanism, a physical Ethernet port is divided into multiple Ethernet flexible hard pipelines based on slot scheduling, and data of multiple Client (or FlexE Client) interfaces are scheduled according to a slot mode and distributed to multiple different sub-channels. Furthermore, service isolation may be achieved. OAM management adopted in the related art is realized above an MAC layer, such as in a main SC, through protocols including Ether OAM and the like.

Herein, a processing engine may be set to perform OAM management in the FlexE layer, so that the data block on the FlexE layer coded in 64B/66B is processed. The FlexE OAM processing engine may be implemented through Application Specific Integrated Circuit (ASIC) and the like. The data block on the FlexE layer is usually transmitted to the FlexE layer through PHY by the communication peer end.

The pre-set first determination rule may be set according to the format of the OAM block, and the first OAM block in the data blocks transmitted in the FlexE layer is extracted into the processing engine for processing through information at a specific position of the OAM block.

In some embodiments, the format of the OAM block may be customized. As shown in FIG. 3, the OAM block may be transmitted by using the same 64B/66B format as that of an ordinary data block, and distinguished by using 0 code in a control block. The 0 code is from the 2th bit to the 9th bit, and the data block can be represented as a control block by using 0x4B. C code is configurable by default, and can be adopted with 0xC; when the C code in the 0x4B control block is 0xC, it is determined that the data block is an OAM block. The OAM block may use six Data in the control block to carry OAM messages, and the specific field format of the OAM block may be shown in FIG. 4.

0x4B field is 0 code, and occupies 8 bits; 0x4B represents that the block is a control block.

Resv field occupies 2 bits, which is a reserved field and has a default value of 0.

Type field occupies 6 bits, and identifies different function types of different OAMs.

Value field occupies 32 bits, and represents contents of an OAM message in a specific type.

C code occupies 4 bits, has a default value of 0xC, the value may be set, and represents that the data block is a FlexE OAM block.

Seq field occupies 4 bits, and is used for identifying sequence numbers of various data blocks in the OAM block composed of multiple data blocks.

CRC4 field occupies 4 bits, and for an OAM block, there are a total of 60 bits for checking when excluding the CRC4, and an algorithm polynomial of the CRC4 may be $x^4+x+1$.

In some embodiments, the first OAM block may include more than one data blocks.

The first OAM block may be composed of one or more data blocks, a composition rule for the OAM block and data content in each of the data blocks may be preset.

In some embodiments, the OAM block may realize different management functions, and the function types of the OAM block may include: a BAS function, an APS function, a CV function, a 1DM function, a 2DMM function, a 2DMR function, a CS function or the like.

The BAS function may include: a connectivity check function, a BIP function, an RDI function, an REI function, a BER calculation function, a CS_LF function and/or a CS_RF function.

The formats of the OAM blocks corresponding to different OAM functions may be shown in FIG. 5. The OAM blocks having different functions may be in a single block form, namely composed of one data block, and may also be in a multi-block form, namely composed of a plurality of data blocks. Functions, identification information, priorities and the like of different OAM blocks may be shown in Table 1.

In some embodiments, out-of-band information corresponding to the first OAM block may be acquired.

The out-of-band information may be independently transmitted in a channel different from that of an ordinary data block, may also be information for counting the data blocks and the like. Out-of-band information having the same transmission slot with the first OAM block may be determined as out-of-band information corresponding to the first OAM block. The out-of-band information may include: Client ID, client link signal quality information, BIP check information, a timestamp while receiving a data block and the like. The Client ID may be determined according to the slot, and the BIP check information may be acquired by a local technology. The timestamp while receiving the data block is a receiving timestamp in the FlexE layer. The out-of-band information may be used for processing of the OAM block.

The processing module 142 is configured to determine the OAM function corresponding to the first OAM block according to the pre-set second determination rule, parse out data in the first OAM block by adopting the pre-set parsing rule according to the function type corresponding to the first OAM block, and execute the OAM function by adopting the parsed data.

Herein, the second determination rule may be determined according to the field format of the first OAM block. Taking the first OAM block in the FIG. 5 as an example, the OAM function type corresponding to the first OAM block may be determined according to the type field.

The pre-set parsing rule may be determined according to a block format corresponding to the OAM function type of the first OAM block. Taking the BIP function of a BAS block as an example, it can be known that the 50th bit to the 57th bit can be parsed as a BIP check code from the block format of an OAM block shown in FIG. 5. Data in a plurality of OAM blocks forming the CV function and the like may also be parsed.

The first OAM block is parsed according to the OAM function type. Required parsed data may be extracted according to the field format of the first OAM block having a respective OAM function type, and the OAM function is executed.

In some embodiments, the OAM function may be executed by adopting the parsed data and the out-of-band information.

Usually, for first OAM blocks having some function types, the corresponding OAM functions may be executed only in combination with the out-of-band information. Herein, such processing may be implemented in combination with the acquired out-of-band information. For example, for a BIP function in BAS, a BIP check code in the first OAM block is required to be compared with a BIP check code in the out-of-band information and the like.

In some embodiments, as shown in FIG. 6, the overall process that the FlexE OAM processing engine performs processing after receiving the data block may include the following operations.

At 601, the data blocks and the out-of-band information are received, and the OAM block is extracted. The out-of-band information may include Client ID, client link signal quality information, BIP check information, a timestamp while receiving a block and the like.

In some embodiments, operation 602 may be executed for the OAM block. The out-of-band information may be transmitted into a processing module of the FlexE OAM processing engine through a bus in the OAM processing engine, and processed in combination with a parsed OAM block.

At 602, data in the OAM block is parsed out according to the type of the OAM block.

At 603, the parsed data of the OAM block and the out-of-band information are processed according to the OAM function type.

At 604, if the OAM function type includes sending information to the communication peer end, corresponding information is replied.

In some embodiments, before the operation that the OAM function is executed by adopting the first OAM block or adopting the first OAM block and the out-of-band information, the method may further include: validity check is performed on the first OAM block; the validity check includes calculation and check of a CRC value.

In some embodiments, as shown in FIG. 7, the parsing process of the FlexE OAM processing engine may include the following operations.

At 701, the module firstly performs validity check on a received OAM block, including calculation and check of a CRC value.

At 702-706, data parsing is respectively implemented according to function types of different OAM blocks. Parsed contents are put into BUS in the processing engine, and are used for specific processing modules of various blocks. Herein, the parsing process may be a process that data required by a respective function type is extracted from the OAM block in a single-block form or a multi-block form. Operation 702 to operation 706 may be executed in any order.

Functions included in the parsed OAM block having the BAS function may be processed in sequence. The processing flow is shown in FIG. 8. Operation 801 to operation 807 may be executed according to a sequence as shown in FIG. 8, and may also be executed through a customized sequence.

At 801, RDI information processing is performed to determine a fault condition at a remote end according to RDI information in the OAM block.

At 802, CS information processing is performed to determine a link failure condition according to CS_LF and/or CS_RF indication information in the OAM block.

At 803, period check is performed to determine a period condition according to data in the OAM block.

At 804, BIP information processing is performed to compare the BIP check code in BAS with the BIP check code in the out-of-band information and to determine whether a transmission problem occurs or not.

At 805, BER calculation processing is performed to calculate the BER of network transmission.

At 806, REI processing is performed to indicate a bit error of remote network connection.

At 807, APS may be triggered according to a link failure condition. The link failure condition may include the BER in operation 805 and the like. The BER may be compared with a BER threshold of SF or SD set by a user. If the BER exceeds a corresponding threshold, it is considered that SF or SD occurs, and APS processing is triggered. When the BER is lower than the BER threshold of SF or SD, SF or SD is eliminated, and a configurable APS switchback processing is triggered.

A CV function usually refers to that an SAPI and a DAPI are compared with a pre-set value and an alarm is generated when there is no matching. As shown in FIG. 9, the processing flow on the parsed OAM block having the CV function may include the following operations.

At 901, a CV block processing module is configured to perform sequence number check.

Herein, the OAM block having the CV function may be composed of a plurality of data blocks. As shown in FIG. 5, the OAM block having the CV function may be composed of eight data blocks. The integrity of the OAM block having the CV function may be checked through a pre-set sequence number.

At S902, SAPI/DAPI in the plurality of data blocks of the OAM block having the CV function are integrated, and furthermore, the integrated SAPI/DAPI is stored.

Herein, data in the plurality of data blocks may be read in sequence, integrated into complete SAPI/DAPI data, and stored.

At 903, comparison with SAPI/DAPI corresponding to Client configured locally is implemented when the plurality of data blocks are received completely, and whether mismatching occurs or not is determined according to a comparison result and reported to a system.

An OAM block having a CS function is used for comparing a client signal with a pre-stored signal. The processing flow on the parsed OAM block having the CS function may only include CS type check. A CS type in a received block is compared with a CS type configured locally, and whether a mismatching occurs or not is determined and reported to the system. Herein, a CS type may include: unequipped, Ethernet, SDH and the like.

An OAM block having a 1DM function is used for detecting delay conditions of sending and receiving. As shown in FIG. 10, the processing flow on the parsed OAM block having the 1DM function may include the following operations.

At 1001, in a processing module, DM storage table entries are indexed based on Client ID of the out-of-band information, a sequence number is checked, integrated processing is implemented on a plurality of blocks, and timestamps of the plurality of blocks of 1DM are stored. In addition, when the plurality of blocks are received completely, for the OAM block having the 1DM function as shown in FIG. 5, correct receiving of two continuous and valid 1DM blocks represents complete receiving.

At 1002, a timestamp in the received OAM block having the 1DM function is used as a timestamp Ttx when sending from a remote end. A timestamp in the out-of-band information is a timestamp Trx when receiving the first 1DM OAM block. According to a definition in specification, line delay is calculated as Delay=Trx-Ttx, which is recorded as a table entry and provided for an upper-level layer to use.

An OAM block having a 2DMM function is used for detecting delay conditions of two-way sending and receiving. Usually, a 2DMR data block is sent after the OAM block having the 2DMM function is received. As shown in FIG. 5, the OAM block having the 2DMM function may be composed of six data blocks. The processing flow on the parsed OAM block having the 2DMM function is shown in FIG. 11.

At 1101, in a 2DMM processing module, a method of receiving and integrating the OAM block having the 2DMM function and acquiring a timestamp is similar to the method of processing the OAM block having the 1DM function.

At 1102, when a plurality of data blocks of the OAM block having the 2DMM function are received completely, 2DMR is required to be replied. The OAM block having the 2DMR function totally includes six continuous data blocks. In replied 2DMR, timestamps in two data blocks in which Seq value is 0 and 1 respectively are replicated from 2DMM. The timestamp in the out-of-band information is a timestamp of receiving 2DMM. The timestamp of receiving 2DMM is set into two data blocks having the 2DMR function in which the Seq value is 2 and 3 respectively, and a timestamp while sending 2DMR is set into two data blocks having the 2DMR function in which the Seq value is 4 and 5 respectively. 2DMR is sent to a peer FlexE device to perform DM.

An OAM block having a 2DMR function is used for detecting delay conditions of two-way sending and receiving. A 2DMR data block received from the communication peer end is usually subjected to delay measurement. The processing flow on the parsed OAM block having the 2DMR function is shown in FIG. 12.

At 1201, in a 2DMR processing module, processing including receiving, integrating, storing and the like is performed on a plurality of data blocks of the OAM block at first.

At 1202, when the plurality of blocks are received completely, timestamp information in 2DMR is required to be subjected to delay calculation. As shown in a 2DMR format in FIG. 5, a corresponding 2DMM sending timestamp (Tx_f_TS), 2DMM receiving timestamp (Rx_b_TS) and 2DMR sending timestamp (Tx_b_TS) may be taken from six blocks of 2DMR, and the timestamp in the out-of-band information is represented as a timestamp when receiving a 2DMR OAM block, namely a 2DRM receiving timestamp. A two-way delay may be calculated as: (the 2DMR receiving timestamp−the 2DMM sending timestamp)−(the 2DMR sending timestamp−2DMM receiving timestamp), and provided for an upper-level layer to use.

In some embodiments, the device may further include a sending module 143, configured to send a second OAM block to the communication peer end in the FlexE layer.

Herein, the second OAM block may be a data block, the transmission direction of which is opposite to that of the first OAM block. The second OAM block is directly sent from the FlexE layer through the OAM processing engine. Therefore, the real-time processing effects of the OAM block may be improved, and the system response performance may be improved. The second OAM block may be a reply data block to the OAM block received from the communication peer end, and may further be an OAM block actively sent to the communication peer end.

In some embodiments, a time pulse of 16K data blocks may be used as a transmitting time unit. The second OAM block is sent to the communication peer end with an interval of a pre-set number of the transmitting time units.

Herein, as shown in FIG. 13, the time pulse of 16K data blocks may be used as a time unit for time counting, indicating the sending time of various OAM blocks. Various function blocks have corresponding sending counting configuration, and a sending counting configuration value takes the time of 16K blocks as a unit. Thereby, different time intervals may be configured for the sending counting configuration value. In entire time cycle, table entries related to all Clients are read with the time interval pulse of the 16K blocks. For each processing, the sending count configured in the table entries is subtracted by 1. When the sending count is subtracted to 0, it represents that the type of OAM block is required to be sent at this time. Then, processing of a sending module is implemented. Furthermore, occurrence count is reset to a configured block sending period, and used for time counting of a next OAM block.

In some embodiments, when the second OAM block has a BAS function, a check code of BIP corresponding to the second OAM block is set into the second OAM block in the FlexE layer. When the second OAM block has a 1DM function or 2DMM function, the sending time of the second OAM block in the FlexE layer is set as a sending timestamp in the second OAM block.

For BAS, a control flag for adding BIP information is required to be increased in the out-of-band information sent to the FlexE layer while accompanying sending of a block. The calculated check code of BIP is set into a corresponding position by the FlexE layer. For a DM related block, a control flag for adding a timestamp is required to be put in the out-of-band information, and the acquired timestamp is set into a corresponding position by the FlexE layer while sending the block.

In actual application, the acquisition module 141, the processing module 142 and the sending module 143 may be implemented by a Central Processing Unit (CPU), a Microcontroller Unit (MCU), a Digital Signal Processor (DSP), a Field Programmable Gate Array (FPGA) or the like in the OAM information processing system.

An embodiment of the disclosure provides a storage medium having stored therein an executable program that, when being executed by a processor, causes the processor to execute a method for processing OAM information. As shown in FIG. 1, the method may include the following operations.

At 101, data blocks sent by a communication peer end are acquired in a FlexE layer, and a first OAM block in the data blocks is determined according to a pre-set first determination rule.

As shown in FIG. 2, the FlexE layer is an intermediate layer created between the MAC layer and the PHY layer. The FlexE provides a universal mechanism, a physical Ethernet is divided into multiple Ethernet flexible hard pipelines based on slot scheduling, and data of multiple Client (or FlexE Client) interfaces are scheduled according to a slot mode and distributed to multiple different subchannels. Furthermore, service isolation may be achieved. OAM management adopted in the related art is realized above an MAC layer, such as in a main SC, through protocols including Ether OAM and the like.

Herein, a processing engine may be set to perform OAM management in the FlexE layer, so that the data block on the FlexE layer coded in 64B/66B is processed. The FlexE OAM processing engine may be implemented through ASIC and the like. The data block on the FlexE layer is usually transmitted to the FlexE layer through PHY by the communication peer end.

The pre-set first determination rule may be set according to the format of the OAM block, and the first OAM block in the data blocks transmitted in the FlexE layer is extracted into the processing engine for processing through information at a specific position of the OAM block.

In some embodiments, the format of the OAM block may be customized. As shown in FIG. 3, the OAM block may be transmitted by using the same 64B/66B format as that of an ordinary data block, and distinguished by using 0 code in a control block. The 0 code is from the 2th bit to the 9th bit, and the data block can be represented as a control block by using 0x4B. C code is configurable by default, and can be adopted with 0xC; when the C code in the 0x4B control block is 0xC, it is determined that the data block is an OAM block. The OAM block may use six Data in the control block to carry OAM messages, and the specific field format of the OAM block may be shown in FIG. 4.

0x4B field is 0 code, and occupies 8 bits; 0x4B represents that the block is a control block.

Resv field occupies 2 bits, which is a reserved field and has a default value of 0.

Type field occupies 6 bits, and identifies different function types of different OAMs.

Value field occupies 32 bits, and represents contents of an OAM message in a specific type.

C code occupies 4 bits, has a default value of 0xC, the value may be set, and represents that the data block is a FlexE OAM block.

Seq field occupies 4 bits, and is used for identifying sequence numbers of various data blocks in the OAM block composed of multiple data blocks.

CRC4 field occupies 4 bits, and for an OAM block, there are a total of 60 bits for checking when excluding the CRC4, and an algorithm polynomial of the CRC4 may be $x^4+x+1$.

In some embodiments, the first OAM block may include more than one data blocks.

The first OAM block may be composed of one or more data blocks, a composition rule for the OAM block and data content in each of the data blocks may be preset.

In some embodiments, the OAM block may realize different management functions, and the function types of the OAM block may include: a BAS function, an APS function, a CV function, a 1DM function, a 2DMM function, a 2DMR function, a CS function or the like.

The BAS function may include: a connectivity check function, a BIP function, an RDI function, an REI function, a BER calculation function, a CS_LF function and/or a CS_RF function.

The formats of the OAM blocks corresponding to different OAM functions may be shown in FIG. 5. The OAM blocks having different functions may be in a single block form, namely composed of one data block, and may also be in a multi-block form, namely composed of a plurality of data blocks. Functions, identification information, priorities and the like of different OAM blocks may be shown in Table 1.

In some embodiments, out-of-band information corresponding to the first OAM block may be acquired.

The out-of-band information may be independently transmitted in a channel different from that of an ordinary data block, may also be information for counting the data blocks and the like. Out-of-band information having the same transmission slot with the first OAM block may be determined as out-of-band information corresponding to the first OAM block. The out-of-band information may include: Client ID, client link signal quality information, BIP check information, a timestamp while receiving a data block and the like. The Client ID may be determined according to the slot, and the BIP check information may be acquired by a local technology. The timestamp while receiving the data block is a receiving timestamp on the FlexE layer. The out-of-band information may be used for processing of the OAM block.

At 102, the OAM function corresponding to the first OAM block is determined according to the pre-set second determination rule; data in the first OAM block is parsed out by adopting the pre-set parsing rule according to the function type corresponding to the first OAM block; and the OAM function is executed by adopting the parsed data.

Herein, the second determination rule may be determined according to the field format of the first OAM block. Taking the first OAM block in the FIG. 5 as an example, the OAM function type corresponding to the first OAM block may be determined according to the type field.

The pre-set parsing rule may be determined according to a block format corresponding to the OAM function type of the first OAM block. Taking the BIP function of a BAS block as an example, it can be known that the 50th bit to the 57th bit can be parsed as a BIP check code from the block format of an OAM block shown in FIG. 5. Data in a plurality of OAM blocks forming the CV function and the like may also be parsed.

The first OAM block is parsed according to the OAM function type. Required parsed data may be extracted according to the field format of the first OAM block having a respective OAM function type, and the OAM function is executed.

In some embodiments, the OAM function may be executed by adopting the parsed data and the out-of-band information.

Usually, for first OAM blocks having some function types, the corresponding OAM functions may be executed only in combination with the out-of-band information. Herein, such processing may be implemented in combination with the acquired out-of-band information. For example, for a BIP function in BAS, a BIP check code in the first OAM block is required to be compared with a BIP check code in the out-of-band information and the like.

In some embodiments, as shown in FIG. 6, the overall process that the FlexE OAM processing engine performs processing after receiving the data block may include the following operations.

At 601, the data blocks and the out-of-band information are received, and the OAM block is extracted. The out-of-band information may include Client ID, client link signal quality information, BIP check information, a timestamp while receiving a block and the like.

In some embodiments, operation 602 may be executed for the OAM block. The out-of-band information may be transmitted into a processing module of the FlexE OAM processing engine through a bus in the OAM processing engine, and processed in combination with a parsed OAM block.

At 602, data in the OAM block is parsed out according to the type of the OAM block.

At 603, the parsed data of the OAM block and the out-of-band information are processed according to the OAM function type.

At 604, if the OAM function type includes sending information to the communication peer end, corresponding information is replied.

In some embodiments, before the operation that the OAM function is executed by adopting the first OAM block or adopting the first OAM block and the out-of-band information, the method may further include: validity check is performed on the first OAM block; the validity check includes calculation and check of a CRC value.

In some embodiments, as shown in FIG. 7, the parsing process of the FlexE OAM processing engine may include the following operations.

At 701, the module firstly performs validity check on a received OAM block, including calculation and check of a CRC value.

At 702-706, data parsing is respectively implemented according to function types of different OAM blocks. Parsed contents are put into BUS in the processing engine, and are used for specific processing modules of various blocks. Herein, the parsing process may be a process that data required by a respective function type is extracted from the OAM block in a single-block form or a multi-block form. Operation 702 to operation 706 may be executed in any order.

Functions included in the parsed OAM block having the BAS function may be processed in sequence. The processing flow is shown in FIG. 8. Operation 801 to operation 807 may be executed according to a sequence as shown in FIG. 8, and may also be executed through a customized sequence.

At 801, RDI information processing is performed to determine a fault condition at a remote end according to RDI information in the OAM block.

At 802, CS information processing is performed to determine a link failure condition according to CS_LF and/or CS_RF indication information in the OAM block.

At 803, period check is performed to determine a period condition according to data in the OAM block.

At 804, BIP information processing is performed to compare the BIP check code in BAS with the BIP check code in the out-of-band information and to determine whether a transmission problem occurs or not.

At 805, BER calculation processing is performed to calculate the BER of network transmission.

At 806, REI processing is performed to indicate a bit error of remote network connection.

At 807, APS may be triggered according to a link failure condition. The link failure condition may include the BER in operation 805 and the like. The BER may be compared with a BER threshold of SF or SD set by a user. If the BER exceeds a corresponding threshold, it is considered that SF or SD occurs, and APS processing is triggered. When the BER is lower than the BER threshold of SF or SD, SF or SD is eliminated, and a configurable APS switchback processing is triggered.

A CV function usually refers to that an SAPI and a DAPI are compared with a pre-set value and an alarm is generated when there is no matching. As shown in FIG. 9, the processing flow on the parsed OAM block having the CV function may include the following operations.

At 901, a CV block processing module is configured to perform sequence number check.

Herein, the OAM block having the CV function may be composed of a plurality of data blocks. As shown in FIG. 5, the OAM block having the CV function may be composed of eight data blocks. The integrity of the OAM block having the CV function may be checked through a pre-set sequence number.

At S902, SAPI/DAPI in the plurality of data blocks of the OAM block having the CV function are integrated, and furthermore, the integrated SAPI/DAPI is stored.

Herein, data in the plurality of data blocks may be read in sequence, integrated into complete SAPI/DAPI data, and stored.

At 903, comparison with SAPI/DAPI corresponding to Client configured locally is implemented when the plurality of data blocks are received completely, and whether mismatching occurs or not is determined according to a comparison result and reported to a system.

An OAM block having a CS function is used for comparing a client signal with a pre-stored signal. The processing flow on the parsed OAM block having the CS function may only include CS type check. A CS type in a received block is compared with a CS type configured locally, and whether a mismatching occurs or not is determined and reported to the system. Herein, a CS type may include: unequipped, Ethernet, SDH and the like.

An OAM block having a 1DM function is used for detecting delay conditions of sending and receiving. As shown in FIG. 10, the processing flow on the parsed OAM block having the 1DM function may include the following operations.

At 1001, in a processing module, DM storage table entries are indexed based on Client ID of the out-of-band information, a sequence number is checked, integrated processing is implemented on a plurality of blocks, and timestamps of the plurality of blocks of 1DM are stored. In addition, when the plurality of blocks are received completely, for the OAM block having the 1DM function as shown in FIG. 5, correct receiving of two continuous and valid 1DM blocks represents complete receiving.

At 1002, a timestamp in the received OAM block having the 1DM function is used as a timestamp Ttx when sending from a remote end. A timestamp in the out-of-band information is a timestamp Trx when receiving the first 1DM OAM block. According to a definition in specification, line delay is calculated as Delay=Trx-Ttx, which is recorded as a table entry and provided for an upper-level layer to use.

An OAM block having a 2DMM function is used for detecting delay conditions of two-way sending and receiving. Usually, a 2DMR data block is sent after the OAM block having the 2DMM function is received. As shown in FIG. 5, the OAM block having the 2DMM function may be composed of six data blocks. The processing flow on the parsed OAM block having the 2DMM function is shown in FIG. 11.

At 1101, in a 2DMM processing module, a method of receiving and integrating the OAM block having the 2DMM function and acquiring a timestamp is similar to the method of processing the OAM block having the 1DM function.

At 1102, when a plurality of data blocks of the OAM block having the 2DMM function are received completely, 2DMR is required to be replied. The OAM block having the 2DMR function totally includes six continuous data blocks. In replied 2DMR, timestamps in two data blocks in which Seq value is 0 and 1 respectively are replicated from 2DMM. The timestamp in the out-of-band information is a timestamp of receiving 2DMM. The timestamp of receiving 2DMM is set into two data blocks having the 2DMR function in which the Seq value is 2 and 3 respectively, and a timestamp while sending 2DMR is set into two data blocks having the 2DMR function in which the Seq value is 4 and 5 respectively. 2DMR is sent to a peer FlexE device to perform DM.

An OAM block having a 2DMR function is used for detecting delay conditions of two-way sending and receiving. A 2DMR data block received from the communication peer end is usually subjected to delay measurement. The processing flow on the parsed OAM block having the 2DMR function is shown in FIG. 12.

At 1201, in a 2DMR processing module, processing including receiving, integrating, storing and the like is performed on a plurality of data blocks of the OAM block at first.

At 1202, when the plurality of blocks are received completely, timestamp information in 2DMR is required to be subjected to delay calculation. As shown in a 2DMR format in FIG. 5, a corresponding 2DMM sending timestamp (Tx_f_TS), 2DMM receiving timestamp (Rx_b_TS) and 2DMR sending timestamp (Tx_b_TS) may be taken from six blocks of 2DMR, and the timestamp in the out-of-band information is represented as a timestamp when receiving a 2DMR OAM block, namely a 2DRM receiving timestamp. A two-way delay may be calculated as: (the 2DMR receiving timestamp−the 2DMM sending timestamp)−(the 2DMR sending timestamp−2DMM receiving timestamp), and provided for an upper-level layer to use.

In some embodiments, a second OAM block may be sent to the communication peer end in the FlexE layer.

Herein, the second OAM block may be a data block, the transmission direction of which is opposite to that of the first OAM block. The second OAM block is directly sent from the FlexE layer through the OAM processing engine. Therefore, the real-time processing effects of the OAM block may be improved, and the system response performance may be improved. The second OAM block may be a reply data block to the OAM block received from the communication peer end, and may further be an OAM block actively sent to the communication peer end.

In some embodiments, a time pulse of 16K data blocks may be used as a transmitting time unit. The second OAM block is sent to the communication peer end with an interval of a pre-set number of the transmitting time units.

Herein, as shown in FIG. 13, the time pulse of 16K data blocks may be used as a time unit for time counting, indicating the sending time of various OAM blocks. Various function blocks have corresponding sending counting configuration, and a sending counting configuration value takes the time of 16K blocks as a unit. Thereby, different time intervals may be configured for the sending counting configuration value. In entire time cycle, table entries related to all Clients are read with the time interval pulse of the 16K blocks. For each processing, the sending count configured in the table entries is subtracted by 1. When the sending count is subtracted to 0, it represents that the type of OAM block is required to be sent at this time. Then, processing of a sending module is implemented. Furthermore, occurrence count is reset to a configured block sending period, and used for time counting of a next OAM block.

In some embodiments, when the second OAM block has a BAS function, a check code of BIP corresponding to the second OAM block is set into the second OAM block in the FlexE layer. When the second OAM block has a 1DM function or 2DMM function, the sending time of the second OAM block in the FlexE layer is set as a sending timestamp in the second OAM block.

For BAS, a control flag for adding BIP information is required to be increased in the out-of-band information sent to the FlexE layer while accompanying sending of a block. The calculated check code of BIP is set into a corresponding position by the FlexE layer. For a DM related block, a control flag for adding a timestamp is required to be put in the out-of-band information, and the acquired timestamp is set into a corresponding position by the FlexE layer while sending the block.

An embodiment of the disclosure provides a device for processing OAM information, which includes a processor, and a memory having stored thereon an executable program executable by the processor. The processor is configured to execute a method for processing OAM information while executing the executable program. As shown in FIG. 1, the method may include the following operations.

At 101, data blocks sent by a communication peer end are acquired in a FlexE layer, and a first OAM block in the data blocks is determined according to a pre-set first determination rule.

As shown in FIG. 2, the FlexE layer is an intermediate layer created between the MAC layer and the PHY layer. The FlexE provides a universal mechanism, a physical Ethernet port is divided into multiple Ethernet flexible hard pipelines based on slot scheduling, and data of multiple Client (or FlexE Client) interfaces are scheduled according to a slot mode and distributed to multiple different sub-channels. Furthermore, service isolation may be achieved. OAM management adopted in the related art is realized above an MAC layer, such as in a main SC, through protocols including Ether OAM and the like.

Herein, a processing engine may be set to perform OAM management in the FlexE layer, so that the data block on the FlexE layer coded in 64B/66B is processed. The FlexE OAM processing engine may be implemented through ASIC and the like. The data block on the FlexE layer is usually transmitted to the FlexE layer through PHY by the communication peer end.

The pre-set first determination rule may be set according to the format of the OAM block, and the first OAM block in the data blocks transmitted in the FlexE layer is extracted into the processing engine for processing through information at a specific position of the OAM block.

In some embodiments, the format of the OAM block may be customized. As shown in FIG. 3, the OAM block may be transmitted by using the same 64B/66B format as that of an ordinary data block, and distinguished by using 0 code in a control block. The 0 code is from the 2th bit to the 9th bit, and the data block can be represented as a control block by using 0x4B. C code is configurable by default, and can be adopted with 0xC; when the C code in the 0x4B control block is 0xC, it is determined that the data block is an OAM block. The OAM block may use six Data in the control block to carry OAM messages, and the specific field format of the OAM block may be shown in FIG. 4.

0x4B field is 0 code, and occupies 8 bits; 0x4B represents that the block is a control block.

Resv field occupies 2 bits, which is a reserved field and has a default value of 0.

Type field occupies 6 bits, and identifies different function types of different OAMs.

Value field occupies 32 bits, and represents contents of an OAM message in a specific type.

C code occupies 4 bits, has a default value of 0xC, the value may be set, and represents that the data block is a FlexE OAM block.

Seq field occupies 4 bits, and is used for identifying sequence numbers of various data blocks in the OAM block composed of multiple data blocks.

CRC4 field occupies 4 bits, and for an OAM block, there are a total of 60 bits for checking when excluding the CRC4, and an algorithm polynomial of the CRC4 may be $x^4+x+1$.

In some embodiments, the first OAM block may include more than one data blocks.

The first OAM block may be composed of one or more data blocks, a composition rule for the OAM block and data content in each of the data blocks may be preset.

In some embodiments, the OAM block may realize different management functions, and the function types of the OAM block may include: a BAS function, an APS function, a CV function, a 1DM function, a 2DMM function, a 2DMR function, a CS function or the like.

The BAS function may include: a connectivity check function, a BIP function, an RDI function, an REI function, a BER calculation function, a CS_LF function and/or a CS_RF function.

The formats of the OAM blocks corresponding to different OAM functions may be shown in FIG. 5. The OAM blocks having different functions may be in a single block form, namely composed of one data block, and may also be in a multi-block form, namely composed of a plurality of data blocks. Functions, identification information, priorities and the like of different OAM blocks may be shown in Table 1.

In some embodiments, out-of-band information corresponding to the first OAM block may be acquired.

The out-of-band information may be independently transmitted in a channel different from that of an ordinary data block, may also be information for counting the data blocks and the like. Out-of-band information having the same transmission slot with the first OAM block may be determined as out-of-band information corresponding to the first OAM block. The out-of-band information may include: Client ID, client link signal quality information, BIP check information, a timestamp while receiving a data block and the like. The Client ID may be determined according to the slot, and the BIP check information may be acquired by a local technology. The timestamp while receiving the data block is a receiving timestamp on the FlexE layer. The out-of-band information may be used for processing of the OAM block.

At 102, the OAM function corresponding to the first OAM block is determined according to the pre-set second determination rule; data in the first OAM block is parsed out by adopting the pre-set parsing rule according to the function type corresponding to the first OAM block; and the OAM function is executed by adopting the parsed data.

Herein, the second determination rule may be determined according to the field format of the first OAM block. Taking the first OAM block in the FIG. 5 as an example, the OAM function type corresponding to the first OAM block may be determined according to the type field.

The pre-set parsing rule may be determined according to a block format corresponding to the OAM function type of the first OAM block. Taking the BIP function of a BAS block as an example, it can be known that the 50th bit to the 57th bit can be parsed as a BIP check code from the block format of an OAM block shown in FIG. 5. Data in a plurality of OAM blocks forming the CV function and the like may also be parsed.

The first OAM block is parsed according to the OAM function type. Required parsed data may be extracted according to the field format of the first OAM block having a respective OAM function type, and the OAM function is executed.

In some embodiments, the OAM function may be executed by adopting the parsed data and the out-of-band information.

Usually, for first OAM blocks having some function types, the corresponding OAM functions may be executed only in combination with the out-of-band information. Herein, such processing may be implemented in combination with the acquired out-of-band information. For example, for a BIP function in BAS, a BIP check code in the first OAM block is required to be compared with a BIP check code in the out-of-band information and the like.

In some embodiments, as shown in FIG. 6, the overall process that the FlexE OAM processing engine performs processing after receiving the data block may include the following operations.

At 601, the data blocks and the out-of-band information are received, and the OAM block is extracted. The out-of-band information may include Client ID, client link signal quality information, BIP check information, a timestamp while receiving a block and the like.

In some embodiments, operation 602 may be executed for the OAM block. The out-of-band information may be transmitted into a processing module of the FlexE OAM processing engine through a bus in the OAM processing engine, and processed in combination with a parsed OAM block.

At 602, data in the OAM block is parsed out according to the type of the OAM block.

At 603, the parsed data of the OAM block and the out-of-band information are processed according to the OAM function type.

At 604, if the OAM function type includes sending information to the communication peer end, corresponding information is replied.

In some embodiments, before the operation that the OAM function is executed by adopting the first OAM block or adopting the first OAM block and the out-of-band information, the method may further include: validity check is performed on the first OAM block; the validity check includes calculation and check of a CRC value.

In some embodiments, as shown in FIG. 7, the parsing process of the FlexE OAM processing engine may include the following operations.

At 701, the module firstly performs validity check on a received OAM block, including calculation and check of a CRC value.

At 702-706, data parsing is respectively implemented according to function types of different OAM blocks. Parsed contents are put into BUS in the processing engine, and are used for specific processing modules of various blocks. Herein, the parsing process may be a process that data required by a respective function type is extracted from the OAM block in a single-block form or a multi-block form. Operation 702 to operation 706 may be executed in any order.

Functions included in the parsed OAM block having the BAS function may be processed in sequence. The processing flow is shown in FIG. 8. Operation 801 to operation 807 may be executed according to a sequence as shown in FIG. 8, and may also be executed through a customized sequence.

At 801, RDI information processing is performed to determine a fault condition at a remote end according to RDI information in the OAM block.

At 802, CS information processing is performed to determine a link failure condition according to CS_LF and/or CS_RF indication information in the OAM block.

At 803, period check is performed to determine a period condition according to data in the OAM block.

At 804, BIP information processing is performed to compare the BIP check code in BAS with the BIP check code in the out-of-band information and to determine whether a transmission problem occurs or not.

At 805, BER calculation processing is performed to calculate the BER of network transmission.

At 806, REI processing is performed to indicate a bit error of remote network connection.

At 807, APS may be triggered according to a link failure condition. The link failure condition may include the BER in operation 805 and the like. The BER may be compared with a BER threshold of SF or SD set by a user. If the BER exceeds a corresponding threshold, it is considered that SF or SD occurs, and APS processing is triggered. When the BER is lower than the BER threshold of SF or SD, SF or SD is eliminated, and a configurable APS switchback processing is triggered.

A CV function usually refers to that an SAPI and a DAPI are compared with a pre-set value and an alarm is generated when there is no matching. As shown in FIG. 9, the processing flow on the parsed OAM block having the CV function may include the following operations.

At 901, a CV block processing module is configured to perform sequence number check.

Herein, the OAM block having the CV function may be composed of a plurality of data blocks. As shown in FIG. 5, the OAM block having the CV function may be composed of eight data blocks. The integrity of the OAM block having the CV function may be checked through a pre-set sequence number.

At S902, SAPI/DAPI in the plurality of data blocks of the OAM block having the CV function are integrated, and furthermore, the integrated SAPI/DAPI is stored.

Herein, data in the plurality of data blocks may be read in sequence, integrated into complete SAPI/DAPI data, and stored.

At 903, comparison with SAPI/DAPI corresponding to Client configured locally is implemented when the plurality of data blocks are received completely, and whether mismatching occurs or not is determined according to a comparison result and reported to a system.

An OAM block having a CS function is used for comparing a client signal with a pre-stored signal. The processing flow on the parsed OAM block having the CS function may only include CS type check. A CS type in a received block is compared with a CS type configured locally, and whether a mismatching occurs or not is determined and reported to the system. Herein, a CS type may include: unequipped, Ethernet, SDH and the like.

An OAM block having a 1DM function is used for detecting delay conditions of sending and receiving. As shown in FIG. 10, the processing flow on the parsed OAM block having the 1DM function may include the following operations.

At 1001, in a processing module, DM storage table entries are indexed based on Client ID of the out-of-band information, a sequence number is checked, integrated processing is implemented on a plurality of blocks, and timestamps of the plurality of blocks of 1DM are stored. In addition, when the plurality of blocks are received completely, for the OAM block having the 1DM function as shown in FIG. 5, correct receiving of two continuous and valid 1DM blocks represents complete receiving.

At 1002, a timestamp in the received OAM block having the 1DM function is used as a timestamp Ttx when sending from a remote end. A timestamp in the out-of-band information is a timestamp Trx when receiving the first 1DM OAM block. According to a definition in specification, line delay is calculated as Delay=Trx-Ttx, which is recorded as a table entry and provided for an upper-level layer to use.

An OAM block having a 2DMM function is used for detecting delay conditions of two-way sending and receiving. Usually, a 2DMR data block is sent after the OAM block having the 2DMM function is received. As shown in FIG. 5, the OAM block having the 2DMM function may be composed of six data blocks. The processing flow on the parsed OAM block having the 2DMM function is shown in FIG. 11.

At 1101, in a 2DMM processing module, a method of receiving and integrating the OAM block having the 2DMM function and acquiring a timestamp is similar to the method of processing the OAM block having the 1DM function.

At 1102, when a plurality of data blocks of the OAM block having the 2DMM function are received completely, 2DMR is required to be replied. The OAM block having the 2DMR function totally includes six continuous data blocks. In replied 2DMR, timestamps in two data blocks in which Seq value is 0 and 1 respectively are replicated from 2DMM. The timestamp in the out-of-band information is a timestamp of receiving 2DMM. The timestamp of receiving 2DMM is set into two data blocks having the 2DMR function in which the Seq value is 2 and 3 respectively, and a timestamp while sending 2DMR is set into two data blocks having the 2DMR function in which the Seq value is 4 and 5 respectively. 2DMR is sent to a peer FlexE device to perform Delay Measure DM.

An OAM block having a 2DMR function is used for detecting delay conditions of two-way sending and receiving. A 2DMR data block received from the communication peer end is usually subjected to delay measurement. The processing flow on the parsed OAM block having the 2DMR function is shown in FIG. 12.

At 1201, in a 2DMR processing module, processing including receiving, integrating, storing and the like is performed on a plurality of data blocks of the OAM block at first.

At 1202, when the plurality of blocks are received completely, timestamp information in 2DMR is required to be subjected to delay calculation. As shown in a 2DMR format in FIG. 5, a corresponding 2DMM sending timestamp (Tx_f_TS), 2DMM receiving timestamp (Rx_b_TS) and 2DMR sending timestamp (Tx_b_TS) may be taken from six blocks of 2DMR, and the timestamp in the out-of-band information is represented as a timestamp when receiving a 2DMR OAM block, namely a 2DRM receiving timestamp. A two-way delay may be calculated as: (the 2DMR receiving timestamp−the 2DMM sending timestamp)−(the 2DMR sending timestamp−2DMM receiving timestamp), and provided for an upper-level layer to use.

In some embodiments, a second OAM block may be sent to the communication peer end in the FlexE layer.

Herein, the second OAM block may be a data block, the transmission direction of which is opposite to that of the first OAM block. The second OAM block is directly sent from the FlexE layer through the OAM processing engine. Therefore, the real-time processing effects of the OAM block may be improved, and the system response performance may be improved. The second OAM block may be a reply data block to the OAM block received from the communication peer end, and may further be an OAM block actively sent to the communication peer end.

In some embodiments, a time pulse of 16K data blocks may be used as a transmitting time unit. The second OAM block is sent to the communication peer end with an interval of a pre-set number of the transmitting time units.

Herein, as shown in FIG. 13, the time pulse of 16K data blocks may be used as a time unit for time counting, indicating the sending time of various OAM blocks. Various function blocks have corresponding sending counting configuration, and a sending counting configuration value takes the time of 16K blocks as a unit. Thereby, different time intervals may be configured for the sending counting configuration value. In entire time cycle, table entries related to all Clients are read with the time interval pulse of the 16K blocks. For each processing, the sending count configured in the table entries is subtracted by 1. When the sending count is subtracted to 0, it represents that the type of OAM block is required to be sent at this time. Then, processing of a sending module is implemented. Furthermore, occurrence count is reset to a configured block sending period, and used for time counting of a next OAM block.

In some embodiments, when the second OAM block has a BAS function, a check code of BIP corresponding to the second OAM block is set into the second OAM block in the FlexE layer. When the second OAM block has a 1DM function or 2DMM function, the sending time of the second OAM block in the FlexE layer is set as a sending timestamp in the second OAM block.

For BAS, a control flag for adding BIP information is required to be increased in the out-of-band information sent to the FlexE layer while accompanying sending of a block. The calculated check code of BIP is set into a corresponding position by the FlexE layer. For a DM related block, a control flag for adding a timestamp is required to be put in the out-of-band information, and the acquired timestamp is set into a corresponding position by the FlexE layer while sending the block.

Described above are merely better embodiments of the disclosure and not intended to limit the scope of protection of the disclosure. Any modifications, equivalent replacements, improvements and the like made within the spirit and principle of the disclosure shall fall within the scope of protection of the disclosure.

The invention claimed is:

1. A method for processing Operation Administration and Maintenance (OAM) information, comprising:
   acquiring data blocks sent by a communication peer end in a Flex Ethernet (FlexE) layer, and determining a first OAM block in the data blocks according to a pre-set first determination rule;
   determining an OAM function corresponding to the first OAM block according to a pre-set second determination rule;
   parsing out data in the first OAM block by adopting a pre-set parsing rule according to a function type corresponding to the first OAM block; and
   executing the OAM function by adopting the parsed data.

2. The method of claim 1, further comprising:
   acquiring out-of-band information corresponding to the first OAM block, and executing the OAM function by adopting the parsed data and the out-of-band information.

3. The method of claim 1, wherein the OAM function corresponding to the first OAM block comprises:
   a Basic (BAS) function, an Automatic Protection Switching (APS) function, a Connectivity Verification (CV) function, a One-way Delay Measure (1DM) function, a Two-Way Delay Measurement Message (2DMM) function, a Two-Way Delay Measurement Reply (2DMR) function or a Client Signal (CS) function;
   the BAS function comprises: a connectivity check function, a Bit Interleaved Parity (BIP) function, a Remote Defect Indication (RDI) function, a Remote Error Indication (REI) function, at least one of a Client Link Near-end Failure (CS_LF) function or a Client Link Remote Failure (CS_RF) function.

4. The method of claim 1, wherein the first OAM block comprises more than one data block.

5. The method of claim 3, further comprising:
   sending a second OAM block to the communication peer end in the FlexE layer.

6. The method of claim 5, wherein sending the second OAM block to the communication peer end comprises: taking a time pulse of 16K data blocks as a transmitting time unit, and sending the second OAM block to the communication peer end with an interval of a pre-set number of the transmitting time units.

7. The method of claim 6, further comprising:
   setting a check code of BIP corresponding to the second OAM block into the second OAM block in the FlexE layer in response to the second OAM block being an OAM block having the BAS function; and
   setting a sending time of the second OAM block in the FlexE layer as a sending timestamp in the second OAM block in response to the second OAM block being an OAM block having the 1DM function or the 2DMM function.

8. A device for processing Operation Administration and Maintenance (OAM) information, comprising:
   a processor; and
   a memory for storing programs executable by the processor,
   wherein the processor is configured to execute the programs to:

acquire data blocks sent by a communication peer end in a Flex Ethernet (FlexE) layer, and determine a first OAM block in the data blocks according to a pre-set first determination rule; and determine an OAM function corresponding to the first OAM block according to a pre-set second determination rule, parse out data in the first OAM block by adopting a pre-set parsing rule according to a function type corresponding to the first OAM block, and execute the OAM function by adopting the parsed data.

9. The device of claim 8, wherein the processor is further configured to:

acquire out-of-band information corresponding to the first OAM block; and execute the OAM function by adopting the parsed data and the out-of-band information.

10. The device of claim 8, wherein the OAM function corresponding to the first OAM block comprises:

a Basic (BAS) function, an Automatic Protection Switching (APS) function, a Connectivity Verification (CV) function, a One-way Delay Measure (1DM) function, a Two-Way Delay Measurement Message (2DMM) function, a Two-Way Delay Measurement Reply (2DMR) function or a Client Signal (CS) function;

the BAS function comprises: a connectivity check function, a Bit Interleaved Parity (BIP) function, a Remote Defect Indication (RDI) function, a Remote Error Indication (REI) function, at least one of a Client Link Near-end Failure (CS_LF) function or a Client Link Remote Failure (CS_RF) function.

11. The device of claim 8, wherein the first OAM block comprises more than one data block.

12. The device of claim 10, wherein the device further comprises a sender, configured to send a second OAM block to the communication peer end in the FlexE layer.

13. The device of claim 12, wherein the sender is specifically configured to: take a time pulse of 16K data blocks as a transmitting time unit, and send the second OAM block to the communication peer end with an interval of a pre-set number of the transmitting time units.

14. The device of claim 13, wherein the sender is further configured to:

set a check code of BIP corresponding to the second OAM block into the second OAM block in the FlexE layer in response to the second OAM block being an OAM block having the BAS function; and set a sending time of the second OAM block in the FlexE layer as a sending timestamp in the second OAM block in response to the second OAM block being an OAM block having the 1DM function or the 2DMM function.

15. A non-transitory computer-readable storage medium having stored therein an executable program that, when being executed by a processor, causes the processor to implement a method for processing Operation Administration and Maintenance (OAM) information, the method comprising:

acquiring data blocks sent by a communication peer end in a Flex Ethernet (FlexE) layer, and determining a first OAM block in the data blocks according to a pre-set first determination rule;

determining an OAM function corresponding to the first OAM block according to a pre-set second determination rule;

parsing out data in the first OAM block by adopting a pre-set parsing rule according to a function type corresponding to the first OAM block; and executing the OAM function by adopting the parsed data.

16. The non-transitory computer-readable storage medium of claim 15, wherein the method further comprises:

acquiring out-of-band information corresponding to the first OAM block, and executing the OAM function by adopting the parsed data and the out-of-band information.

17. The non-transitory computer-readable storage medium of claim 15, wherein the OAM function corresponding to the first OAM block comprises:

a Basic (BAS) function, an Automatic Protection Switching (APS) function, a Connectivity Verification (CV) function, a One-way Delay Measure (1DM) function, a Two-Way Delay Measurement Message (2DMM) function, a Two-Way Delay Measurement Reply (2DMR) function or a Client Signal (CS) function;

the BAS function comprises: a connectivity check function, a Bit Interleaved Parity (BIP) function, a Remote Defect Indication (RDI) function, a Remote Error Indication (REI) function, at least one of a Client Link Near-end Failure (CS_LF) function or a Client Link Remote Failure (CS_RF) function.

18. The non-transitory computer-readable storage medium of claim 15, wherein the first OAM block comprises more than one data block.

19. The non-transitory computer-readable storage medium of claim 15, wherein the method further comprises:

sending a second OAM block to the communication peer end in the FlexE layer.

20. The non-transitory computer-readable storage medium of claim 19, wherein sending the second OAM block to the communication peer end comprises: taking a time pulse of 16K data blocks as a transmitting time unit, and sending the second OAM block to the communication peer end with an interval of a pre-set number of the transmitting time units.

* * * * *